United States Patent
Yang et al.

(10) Patent No.: US 11,378,723 B2
(45) Date of Patent: Jul. 5, 2022

(54) OPTICAL FILM AND OPTICAL SYSTEM

(71) Applicant: 3M INNOVATIVE PROPERTIES COMPANY, St. Paul, MN (US)

(72) Inventors: Zhaohui Yang, North Oaks, MN (US); Brett J. Sitter, Cottage Grove, MN (US); James A. Thielen, Hugo, MN (US); Nathaniel K. Naismith, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 248 days.

(21) Appl. No.: 16/500,517

(22) PCT Filed: May 22, 2018

(86) PCT No.: PCT/IB2018/053615
§ 371 (c)(1),
(2) Date: Oct. 3, 2019

(87) PCT Pub. No.: WO2018/220473
PCT Pub. Date: Dec. 6, 2018

(65) Prior Publication Data
US 2021/0286113 A1    Sep. 16, 2021

Related U.S. Application Data

(60) Provisional application No. 62/514,167, filed on Jun. 2, 2017.

(51) Int. Cl.
*G02B 5/18* (2006.01)
(52) U.S. Cl.
CPC ......... *G02B 5/1819* (2013.01); *G02B 5/1866* (2013.01); *G02B 2005/1804* (2013.01)

(58) Field of Classification Search
CPC ...... G02B 5/18; G02B 5/1814; G02B 5/1819; G02B 5/1842; G02B 5/1866; G02B 2005/1804; G02B 5/0215; G02B 5/0231
See application file for complete search history.

(56) References Cited

U.S. PATENT DOCUMENTS

| 4,374,077 A | 2/1983 | Kerfeld |
| 4,576,850 A | 3/1986 | Martens |

(Continued)

FOREIGN PATENT DOCUMENTS

| JP | 05307174 | 11/1993 |
| WO | WO 2000-48037 | 8/2000 |

(Continued)

OTHER PUBLICATIONS

International Search Report for PCT International Application No. PCT/IB2018/053615, dated Aug. 20, 2018, 4 pages.

*Primary Examiner* — Kimberly N. Kakalec
(74) *Attorney, Agent, or Firm* — Clifton F. Richardson

(57) ABSTRACT

A multilayer optical film including a first layer having an index of refraction n1 at a wavelength λ in a range from about 580 nm to about 650 nm, and a second layer having an index of refraction n2 at λ is described. The first and second layers define an interface therebetween comprising a two-dimensional grating. The grating may have an average height H such that |n1−n2|*H is in a range from 0.24 micrometers to 0.3 micrometers. Optical systems including the multilayer optical film are described. A subpixel in a display surface of the optical system may be diffracted into a zero diffraction order and a plurality of first diffraction orders where the intensities of the zero and first diffraction orders are with 10% of each other at λ. The optical system may have a modulation transfer function greater than 0.4 at 10 line pairs per millimeter.

14 Claims, 6 Drawing Sheets

(56) References Cited

U.S. PATENT DOCUMENTS

| | | |
|---|---|---|
| 5,175,030 A | 12/1992 | Lu |
| 5,183,597 A | 2/1993 | Lu |
| 5,271,968 A | 12/1993 | Coyle |
| 5,558,740 A | 9/1996 | Bernard |
| 5,991,083 A | 11/1999 | Shirochi |
| 5,995,690 A | 11/1999 | Kotz |
| 7,140,812 B2 | 11/2006 | Bryan |
| 7,328,638 B2 | 2/2008 | Gardiner |
| 7,350,442 B2 | 4/2008 | Ehnes |
| 9,360,591 B2 | 6/2016 | Hunt |
| 9,557,568 B1 | 1/2017 | Ouderkirk |
| 2013/0127689 A1 | 5/2013 | Gollier |
| 2016/0016338 A1 | 1/2016 | Radcliffe |
| 2016/0070103 A1 | 3/2016 | Yoon |
| 2016/0127717 A1 | 5/2016 | Petrov |
| 2016/0231566 A1 * | 8/2016 | Levola ............... G02B 27/0081 |
| 2017/0115498 A1 | 4/2017 | Sitter |
| 2017/0131559 A1 | 5/2017 | Sitter |
| 2018/0088349 A1 | 3/2018 | Sakohira |

FOREIGN PATENT DOCUMENTS

| | | | |
|---|---|---|---|
| WO | WO-2015191949 A1 * | 12/2015 | ......... G02B 27/1093 |
| WO | WO 2017-002278 | 1/2017 | |

\* cited by examiner

OPTICAL FILM AND OPTICAL SYSTEM

BACKGROUND

Pixelated displays typically have gaps between adjacent pixels and subpixels. In some cases, these gaps result in optical artifacts known as the screen-door effect which may be objectionable to viewers.

SUMMARY

In some aspects of the present description, a multilayer optical film including a first optical layer and a second optical layer disposed on the first optical layer is provided. The first optical layer has an index of refraction n1 at a wavelength λ in a range from about 580 nm to about 650 nm, and the second optical layer has an index of refraction n2 at λ. The first and second optical layers define a structured interface therebetween including a two-dimensional substantially sinusoidal grating extending along mutually orthogonal first and second directions. The grating has a period T in a range from about 7.5 micrometers to about 10 micrometers along each of the first and second directions and an average height H, such that |n1−n2|*H is in a range from about 0.24 micrometers to about 0.3 micrometers. The multilayer optical film may be a screen-door effect mitigation film for reducing the screen-door effect of a display.

In some aspects of the present description, a display including a light source; a two-dimensionally pixelated display surface for displaying an image, each pixel including at least three spaced apart subpixels; and a multilayer optical film disposed on the display surface is provided. The multilayer optical film includes first and second optical layers defining a two-dimensional grating interface therebetween extending along mutually orthogonal first and second directions. The first and second directions define mutually orthogonal first and second diagonal directions therebetween. The grating diffracts at least one subpixel in each pixel into a zero diffraction order and a plurality of first diffraction orders along each of the first, second, first diagonal and second diagonal directions at a wavelength λ in a range from about 580 nm to about 650 nm, such that intensities of the zero and first diffraction orders are within 10% of each other.

In some aspects of the present description, an optical system including a light source; a two-dimensionally pixelated display surface for displaying an image; and first and second optical layers disposed on the display surface and defining a two-dimensional grating interface therebetween is provided. An absolute value of a difference between indices of refraction of the first and second optical layers at a wavelength λ in a range from about 580 nm to about 650 nm is in a range from about 0.10 to about 0.25. The grating interface has a period T in a range from about 7.5 micrometers to about 10 micrometers and an average height H in a range from about 1.1 micrometers to about 2.4 micrometers. When the display surface displays an image having a spatial frequency of about 10 line pairs per mm, the optical system magnifies the displayed image through the grating interface as a virtual image for viewing by a viewer. A modulation transfer function (MTF) of the virtual image is greater than about 0.4.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Displays typically include a two-dimensionally pixelated display surface. In some cases, the spaces between the pixels or subpixels are visible to a viewer and this may be objectionable, particularly in head-mounted displays in which an optical system magnifies a displayed image for viewing by a viewer. This is known as the screen-door effect or fixed-pattern noise. According to some embodiments, of the present description, multilayer optical films for reducing the screen-door effect of a display are provided. The multilayer optical films may be referred to as screen-door effect mitigation films. According to some embodiments of the present description, it has been found that diffraction gratings having the heights, periods and index contrasts (differences in refractive indices on opposite sides of the grating) described herein can be used in an optical system to significantly reduce the screen-door effect while preserving a desired perceived image resolution. The gratings may be provided as a structured interface between first and second optical layers of a multilayer optical film.

Figure 1A:
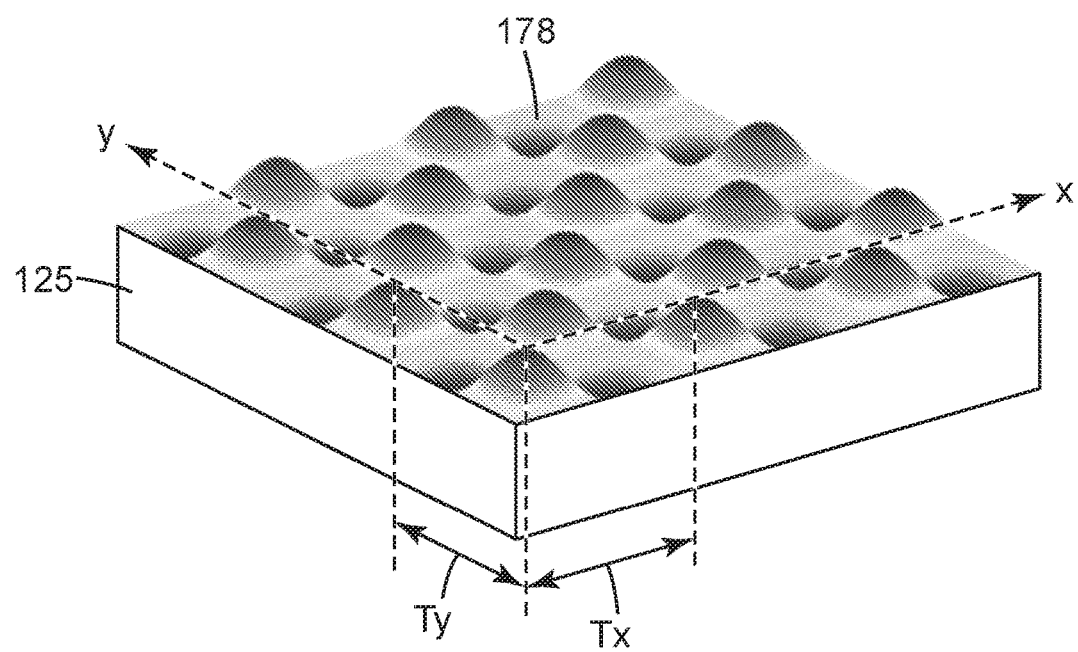
FIG. 1A is a perspective view of an optical layer.

FIG. 1A shows a first optical layer 125 having a first major surface 178 which has a two-dimensional structure having a first period Tx along a first direction (x-direction) and a second period Ty along an orthogonal second direction (y-direction). In some embodiments, one or both of Tx and Ty are in a range from about 1 micrometer, or about 5 micrometers, or about 7.5 micrometers, or about 8 micrometers, to about 30 micrometers, or about 20 micrometers, or about 15 micrometers, or about 10 micrometers, or about 9.5 micrometers. In some embodiments, Tx and Ty are within about 10% of each other.

Figure 1B:
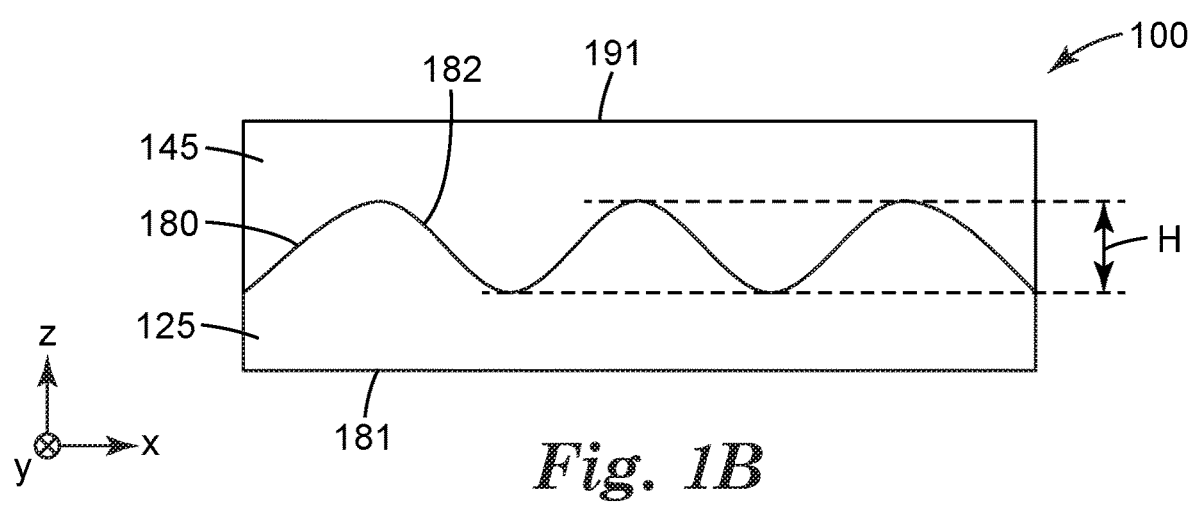
FIG. 1B is a schematic cross-sectional view of a multi-layer optical film including the optical layer of FIG. 1A.

FIG. 1B shows a multilayer optical film 100 which includes the first optical layer 125 of FIG. 1A and a second optical layer 145 disposed on the first optical layer 125. The first and second optical layers 125 and 145 define a structured interface 180 therebetween comprising a two-dimensional grating 182 extending along mutually orthogonal first and second directions (x- and y-directions). In some embodiments, the structured interface 180 is continuous across the width and length of the multilayer optical film 100. In some embodiments, the two-dimensional grating 182 is continuous across the width and length of the multilayer optical film 100. In some embodiments, the two-dimensional grating 182 is a substantially sinusoidal grating. A sinusoidal grating has a height (in the z-direction) relative to a center plane that varies sinusoidally with position along the center plane (x- and y-positions). A substantially sinusoidal grating is a grating that gives a negligible difference in the diffraction pattern produced by incident visible light from that produced by a sinusoidal grating. A substantially sinusoidal grating may be nominally sinusoidal but differ from sinusoidal due to ordinary manufacturing variations, for example. The grating 182 has an average height H.

Figure 9:
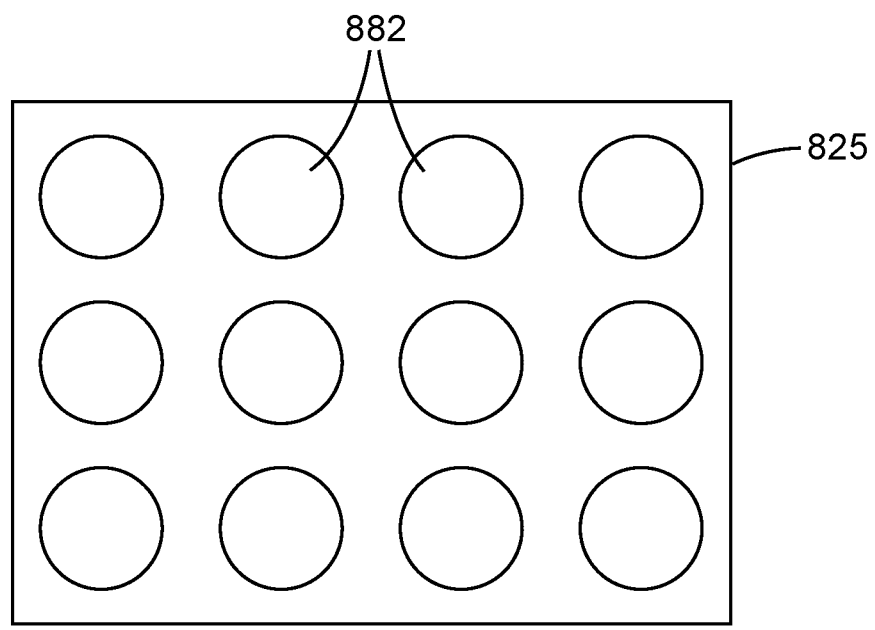
FIG. 9 is a schematic top view of an optical layer.

In other embodiments, other grating patterns are used. FIGS. 8A-8D schematically illustrate multilayer optical films 700a-700d including first 725a-725d and second 745a-745d optical layers with two-dimensional grating 782a-782d therebetween, respectively. Grating 782a is a rectangular grating, grating 782b is a square grating which can be understood to be a special case of a rectangular grating, grating 782c is a triangular grating, and grating 782d is a sawtooth grating. In any of these cases, the grating element (rectangle, square, triangle or sawtooth) may extend an equal or approximately equal distance in each of the two in-plane directions. For example, the grating element may be a post or a pyramid or a cone. FIG. 9 is a schematic top view of a first optical layer 825 having a structured surface including a plurality of posts 882. First optical layer 825 can be coated with a second optical layer to form a grating interface comprising a post pattern. The posts can have a circular, elliptical, square, rectangular or triangular cross-section for example. The posts can have a uniform cross-section or can be tapered. The posts can be arranged on a square lattice as illustrated, or can be arranged on other lattices such as a triangular lattice, for example.

In some embodiments, the two-dimensional grating 182 has a period T, which may correspond to either or both of Tx and Ty, in any of the ranges described elsewhere herein. For example, in some embodiments, the period T is in a range of 1 micrometer to 30 micrometers, or in a range of 7.5 micrometers to 10 micrometers, along each of the first and second directions. In some embodiments, the period along the first and second directions are equal or about equal. In other embodiments, the period T may be different in the different directions. For example, in some embodiments, the period T is about 8 micrometers along the first direction and the period T is about 9 micrometers along the second direction.

First optical layer 125 includes first outer major surface 181 and second optical layer 145 includes second outer major surface 191. In some embodiments, first outer major surface 181 is a substantially planar surface. In some embodiments, second outer major surface 191 is a substantially planar surface. Additional layers (e.g., a hardcoat layer or release liner) may be disposed on one or both of the first and second outer major surfaces 181 and 191. Suitable materials for use as first optical layer 125 or second optical layer 145 include polymers, crosslinkable or crosslinked resins, and optically clear adhesives. In some embodiments, at least one of the first and second optical layers 125 and 145 comprises a crosslinked resin. Suitable resins are described further elsewhere herein. In some embodiments, at least one of the first and second optical layers 125 and 145 comprises an optically clear adhesive. Suitable adhesives are described further elsewhere herein. In some embodiments, the first optical layer 125 comprises a crosslinked resin and the second optical layer 145 comprises an optically clear adhesive. In some embodiments, the second optical layer 145 is an optically clear adhesive that is applied to first optical layer 125 forming a planarized layer.

In some embodiments, multilayer optical film 100 is a screen-door effect mitigation film for reducing a screen-door effect of a display. An optical system may include the multilayer optical film 100 proximate a two-dimensionally pixelated display surface in order to reduce the appearance of the screen-door effect caused by gaps between pixels and/or subpixels of the display surface while preserving a desired degree of resolution as described further elsewhere herein. According to some embodiments, it has been found that it is particularly advantageous to select the grating of the multilayer optical film to diffract a specified wavelength $\lambda$ into approximately equal intensity zero and first diffraction orders, where $\lambda$ is a wavelength between a peak green wavelength and a peak red wavelength, for example, emitted by the display.

At a wavelength $\lambda$, the first optical layer 125 has a first refractive index n1 and the second optical layer 145 has a second refractive index n2. In some embodiments, the absolute value of the difference in the first and second refractive indices, $|n1-n2|$, is at least about 0.05, or at least about 0.08, or at least about 0.1, or at least about 0.12, or at least about 0.14. In some embodiments, the absolute value of the difference in the first and second refractive indices, $|n1-n2|$, is no more than about 0.3, or no more than about 0.26, or no more than 0.25, no more than about 0.24, or no more than about 0.22, or no more than about 0.2, or no more than about 0.19, no more than about 0.18. For example, in some embodiments, $|n1-n2|$ is in a range of about 0.08 to about 0.25, or in a range of about 0.1 to about 0.25, or in a range of about 0.1 to about 0.2, or in a range of about 0.14 to about 0.18. In some embodiments, the wavelength $\lambda$ is at least about 550 nm, or at least about 580 nm, or at least about 590 nm, or at least about 595 nm. In some embodiments, the wavelength $\lambda$ is no more than about 650 nm, or no more than about 633 nm, or no more than about 620 nm, or no more than about 610 nm, or no more than about 605 nm. For example, in some embodiments, $\lambda$ is in a range from about 580 nm to about 650 nm. In some embodiments, $\lambda$ is about 600 nm. In some embodiments, the wavelength $\lambda$ is specified relative to peak wavelengths of an emission spectrum of a display surface instead of, or in addition to, specifying an absolute wavelength range.

In some embodiments, a grating is described by an equation of the form $$h = \tfrac{1}{2} A[f1(x) + f2(y)] \qquad \text{(Equation 1)}$$

where x and y are in-plane coordinates, h is the displacement in the z-direction from a reference plane, f1(x) and f2(y) are periodic functions of x and y, respectively, that are normalized to vary between −1 and 1, and A is a parameter characterizing the peak to valley height of the grating. For a fixed x, A is the peak to valley height of the grating as y is varied. Similarly, for a fixed y, A is the peak to valley height of the grating as x is varied. In this case, the parameter A is an average height of the grating which may be denoted as H. In some embodiments, f1(x) and f2(y) are sine functions. For example, in some embodiments, a sinusoidal grating is described by $$h = \tfrac{1}{2} A[\sin(2\pi x/Tx) + \sin(2\pi y/Ty)] \qquad \text{(Equation 2)}$$

where Tx and Ty are periods in the x and y directions, respectively. In some embodiments, a grating is described by Equation 1 or by Equation 2 and the average height H of the grating is equal to the parameter A. In some embodiments, a grating has uniform peak heights and uniform valley heights, and the average height H is the peak to valley height. In some embodiments, the peak heights and the valley heights are nominally uniform but may vary due to ordinary manufacturing variations, for example. In this case, the average height H may be taken to be the average peak height minus the average valley height. In some embodiments, the average height H of a grating is taken to be 2 times the root mean square average of the height h relative to a center or mean height. This can be expressed as twice the standard deviation of the height or $H=2<(h-<h>)^2>^{1/2}$. For a sinusoidal grating described by Equation 2, this gives $<h>=0$, $<h^2>=A^2/4$, and $H=A$.

In some embodiments, H is at least about 0.8 micrometers, or at least about 1 micrometer, or at least about 1.1 micrometers, or at least about 1.2 micrometers, or at least about 1.3 micrometers, or at least about 1.4 micrometers. In some embodiments, H is no more than about 6 micrometers, or no more than about 4 micrometers, or no more than about 3 micrometers, or no more than about 2.5 micrometers, or no more than about 2.4 micrometers, or no more than about 2.3 micrometers, or no more than about 2.1 micrometers, or no more than about 1.9 micrometers. For example, in some embodiments, H is in a range from about 1.1 micrometers to about 2.4 micrometers.

In some embodiments, $|n1-n2|*H$ is at least about 0.21 micrometers, at least about 0.22 micrometers, or at least about 0.23 micrometers, or at least about 0.24 micrometers, or at least about 0.25 micrometers, or at least about 0.255 micrometers, or at least about 0.26 micrometers. In some embodiments, $|n1-n2|*H$ is no more than about 0.3 micrometers, or no more than about 0.29 micrometers, or no more than about 0.28 micrometers, or no more than about 0.275 micrometers, or no more than about 0.27 micrometers. For example, in some embodiments, $|n1-n2|*H$ is in a range of about 0.22 micrometers to about 0.3 micrometers, or in a range of about 0.24 micrometers to about 0.3 micrometers, or in a range of about 0.24 micrometers to about 0.29 micrometers, or in a range of about 0.25 micrometers to about 0.28 micrometers, or in a range of about 0.255 micrometers to about 0.275 micrometers.

The multilayer optical film 100 can be produced in a variety of ways. In some embodiments, the first optical layer is made by first producing a release tool. The release tool can be made by casting and curing (e.g., in a continuous cast and cure process) a layer having a structured surface on a film, such as a polyethylene terephthalate (PET) film. In a continuous cast and cure process a micro-replication roll can be made using a diamond tool to cut an inverted pattern into a copper roll which can be used to make the pattern on a substrate using a continuous cast and cure process utilizing a polymerizable resin. Suitable diamond tooling is known in the art and includes the diamond tooling described in U.S. Pat. No. 7,140,812 (Bryan et al.). Continuous cast and cure processes are known in the art and are described in the following patents: U.S. Pat. No. 4,374,077 (Kerfeld); U.S. Pat. No. 4,576,850 (Martens); U.S. Pat. No. 5,175,030 (Lu et al.); U.S. Pat. No. 5,271,968 (Coyle et al.); U.S. Pat. No. 5,558,740 (Bernard et al.); and U.S. Pat. No. 5,995,690 (Kotz et al.). The resulting structure can then be treated using conventional surface treatment techniques to produce a structured release tool. For example, a surface treatment may include an oxygen plasma treatment followed by a tetramethylsilane (TMS) plasma treatment. A crosslinkable resin, for example, can then be coated onto the treated surface of the release tool and cured. The release tool can then be removed to produce a first optical layer 125 that can be coated with a second optical layer 145 to provide the multilayer optical film 100. Additional processes useful for making multilayer optical film 100 include those described in U.S. Pat. Appl. Pub. Nos. 2016/0016338 (Radcliffe et al.), 2017/0131559 (Sitter et al.), and 2017/0115498 (Sitter et al.), each of which is hereby incorporated herein by reference to the extent that it does not contradict the present description.

In other embodiments, first optical layer 125 is cast and cured onto a polymer substrate and then the second optical layer 145 is coated onto the first optical layer 125. In this case, the polymer substrate is an additional layer in the multilayer optical film 100. In other embodiments, the first major surface 178 is structured by machining, for example, a structure into an outer surface of a film, and the second optical layer 145 is formed by coating onto the resulting machined surface.

In some embodiments, one of both of the first and second optical layers is a crosslinked resin layer. Crosslinkable or curable resins may be deposited or coated onto a surface in liquid form and then the coating cured, for example, by applying actinic radiation or heat, to form a crosslinked resin layer. The actinic radiation used to cure the coating of curable resin may be e-beam or ultraviolet (UV) radiation. Crosslinking a coated resin in this way can result in a layer with low or substantially no birefringence.

Suitable curable resins that can be used for forming one or both of the first and second optical layers include UV-curable acrylates, such as such as polymethyl methacrylate (PMMA), aliphatic urethane diacrylates (such as Photomer 6210, available from Sartomer Americas, Exton, Pa.), epoxy acrylates (such as CN-120, also available from Sartomer Americas), and phenoxyethyl acrylate (available from Sigma-Aldrich Chemical Company, Milwaukee, Wis.). Other suitable curable resins include moisture cured resins such as Primer M available from MAPEI Americas (Deerfield Beach, Fla.).

In some embodiments, one of both of the first and second optical layers is an adhesive layer, such as an optically clear adhesive layer. An optically clear adhesive has a high transmittance and a low haze. For example, in some embodiments, an optically clear adhesive layer has a transmittance of at least 95%, or at least 98%, or at least 99%, and a haze of less than about 5%, or less than about 2%, or less than about 1%. A non-adhesive (e.g., crosslinked resin) layer may also be optically clear with a transmittance and haze in any of these ranges. Suitable adhesives include viscoelastic or elastomeric adhesives which may be pressure-sensitive adhesives (PSAs), rubber-based adhesives (e.g., rubber, urethane) and silicone-based adhesives. Viscoelastic or elastomeric adhesives also include heat-activated adhesives which are non-tacky at room temperature but become temporarily tacky and are capable of bonding to a substrate at elevated temperatures. Heat activated adhesives are activated at an activation temperature and above this temperature have similar viscoelastic characteristics as PSAs. Viscoelastic or elastomeric adhesives may be substantially transparent and optically clear. Any of the viscoelastic or elastomeric adhesives of the present description may be viscoelastic optically clear adhesives. Elastomeric materials may have an elongation at break of greater than about 20 percent, or greater than about 50 percent, or greater than about 100 percent. Viscoelastic or elastomeric adhesive layers may be applied directly as a substantially 100 percent solids adhesive or may be formed by coating a solvent-borne adhesive and evaporating the solvent. Viscoelastic or elastomeric adhesives may be hot melt adhesives which may be melted, applied in the melted form and then cooled to form a viscoelastic or elastomeric adhesive layer.

Suitable adhesives include elastomeric polyurethane or silicone adhesives and the viscoelastic optically clear adhesives CEF22, 817x, and 818x, all available from 3M Company, St. Paul, Minn. Other useful viscoelastic or elastomeric adhesives include PSAs based on styrene block copolymers, (meth)acrylic block copolymers, polyvinyl ethers, polyolefins, and poly(meth)acrylates.

Figure 2:
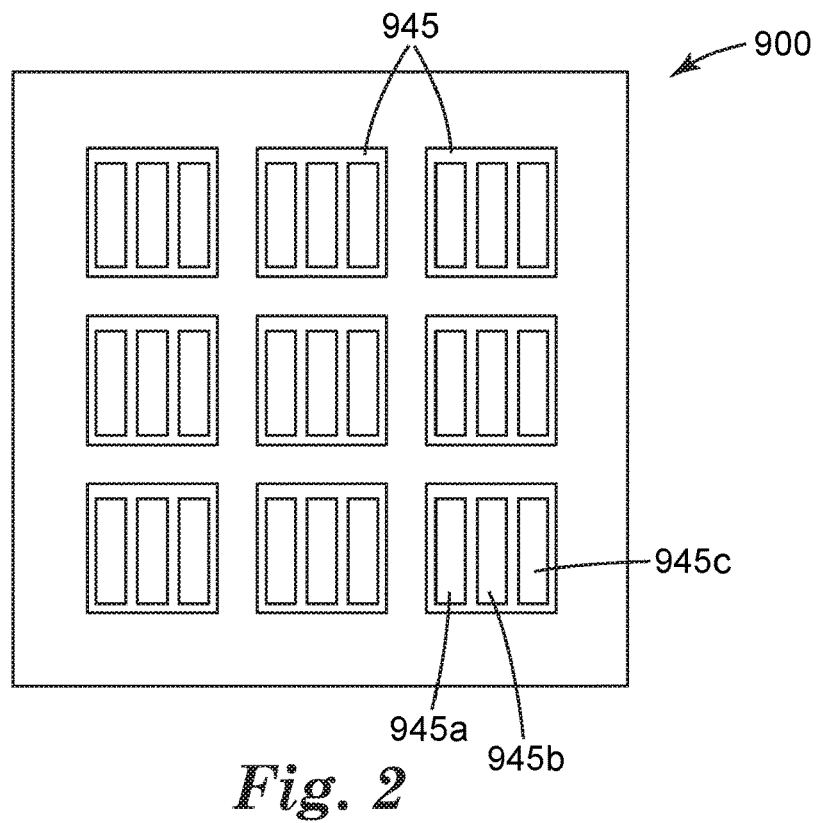
FIG. 2 is a schematic top view of a pixelated display surface.

FIG. 2 is a schematic illustration of a two-dimensionally pixelated display surface 900 for displaying an image. The display surface 900 includes a plurality of pixels 945. Each of the pixels 945 typically includes three or more subpixels which allow a desired color to be produce by each pixel 945. For example, the illustrated subpixels 945a, 945b and 945c may be blue, green and red subpixels which can have output levels adjustable to provide a desired color and a desired intensity. Additional subpixels (e.g., yellow) may be included in some embodiments. The pixel and subpixel arrangement can be similar to or different from that schematically illustrated in FIG. 2. For example, a triangular pattern, striped pattern, diagonal pattern, or a PENTILE matrix can be used as is known in the art. In the case of a PENTILE matrix which includes red and green pairs of subpixels and green and blue pairs of subpixels, for example, each pixel can be understood to include a red and green pair and a green and blue pair, so that each pixel includes four subpixels. In some embodiments, an organic light emitting diode (OLED) display is used and the subpixels 945a, 945b and 945c include emissive layers which are used as the light source for the display. In some embodiments, a liquid crystal display (LCD) is used and a separate light source is used to provide a light input into a backlight of the LCD display and the pixels and subpixels are formed by the LCD panel.

Figure 3:
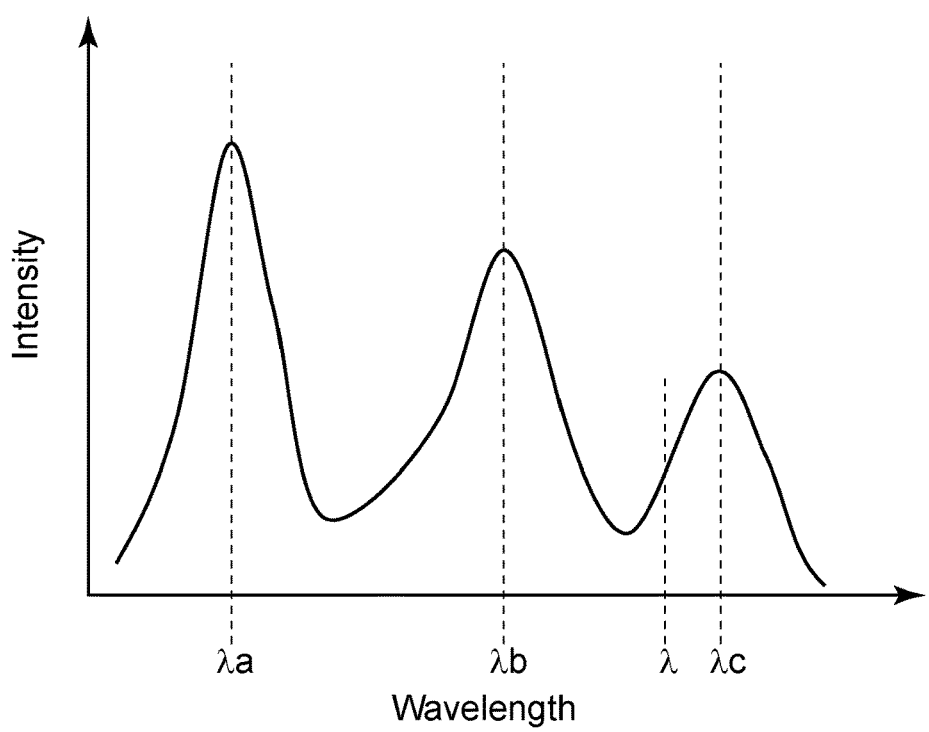
FIG. 3 is a schematic illustration of an emission spectrum produced by a display surface.

FIG. 3 is a plot of an emission spectrum produced by a display surface. Three peaks are present corresponding to colors of the subpixels 945a, 945b and 945c. The shortest peak wavelength is denoted λa, the longest peak wavelength is denoted λc, and an intermediate peak wavelength is denoted λb. In the case of an OLED display, the wavelength dependence may be provided by a pixelated emissive layer, for example. In the case of an LCD display, the wavelength dependence may be provided a color filter, for example. In some embodiments, λa is in a range of about 400 nm to about 500 nm, λc is in a range of about 580 nm to 700 nm, and λb is greater than λa and less than λc. In some embodiments, λa is in a range from about 440 nm to about 480 nm, λb is in a range of about 510 nm to about 550 nm, and λc is in a range of about 600 nm to about 640 nm. In some embodiments, the wavelength λ at which the refractive indices of the first and second optical layers are specified and at which |n1−n2|*H is selected to produce approximately equal zero and first diffraction orders as described further elsewhere herein is between λb and λc as illustrated in FIG. 3. In some embodiments, λ is equal to $(1-\alpha)*\lambda b+\alpha*\lambda c$ where α is at least 0.5, or at least 0.6, or at least 0.7 and is no more than 0.95, or no more than 0.92, or no more than 0.9, or no more than 0.88. For example, in some embodiments, α is in a range of 0.7 to 0.9.

Figure 4:
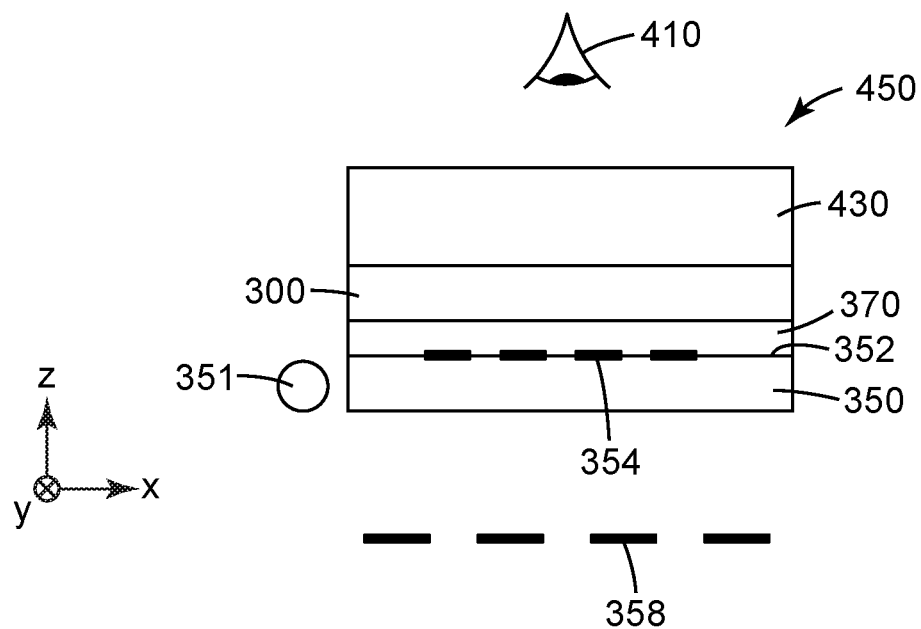
FIG. 4 is a schematic cross-sectional view of an optical system.

FIG. 4 is a schematic cross-sectional view of an optical system 450 including a multilayer optical film 300, which may correspond to multilayer optical film 100, for example, disposed proximate a display component 350 having a display surface 352. The multilayer optical film 300 includes first and second optical layers (not illustrated in FIG. 4) with a grating interface disposed therebetween as described further elsewhere herein (see, e.g., FIG. 1B). Either the first or the second optical layer may be disposed facing the display surface 352. The display surface 352 may be a two-dimensionally pixelated display surface as described further elsewhere herein. In some embodiments, the display component 350 is an LCD display and a light source 351 may be included to provide light input to a backlight of the liquid crystal display. Light source 351 may be a white light or may include a plurality of colored light emitting diodes (LEDs), for example. In some embodiments, the display component 350 is an OLED display. In this case the separate light source 351 may be omitted and the light source for the display is the emissive layer of the pixels or subpixels of the display. In some embodiments, the display surface 352 displays an image 354 and the optical system 450 magnifies the displayed image 354 through a grating interface in the multilayer optical film 300 as a virtual image 358 for viewing by a viewer 410. In some embodiments, at least one additional layer 370 is disposed between the multilayer optical film 300 and the display surface 352. In other embodiments, the at least one additional layer 370 is omitted and the multilayer optical film 300 is disposed directly on the display surface 352.

As is known in the art, the modulation transfer function (MTF) can be a useful quantity to characterize the resolution of a display. The MTF can be determined by displaying an image of a line chart at a given spatial frequency and determining the maximum and minimum intensities in the displayed image. The MTF is given by the ratio of the difference in the maximum and minimum intensity divided by the sum of the maximum and minimum intensities. In some embodiments, the displayed image 354 has a spatial frequency of about 10 line pairs per mm and a modulation transfer function (MTF) of the virtual image 358 is greater than about 0.4, or greater than about 0.45, or greater than about 0.5. It has been found that the MTF at a spatial frequency of 10 line pairs per mm gives a useful characterization of the resolution of the display. MTF will refer to herein as the MTF at 10 lines pairs per mm except where indicated differently.

The optical system 450 may also be referred to as a display or as a display system or as a component of a display or a display system. The optical system 450 may further include additional optical elements 430 which may include refractive optical elements and/or components configured to provide a folded optical path as described in U.S. Pat. No. 9,557,568 (Ouderkirk et al.), which is hereby incorporated herein by reference to the extent that it does not contradict the present description.

Figure 5:
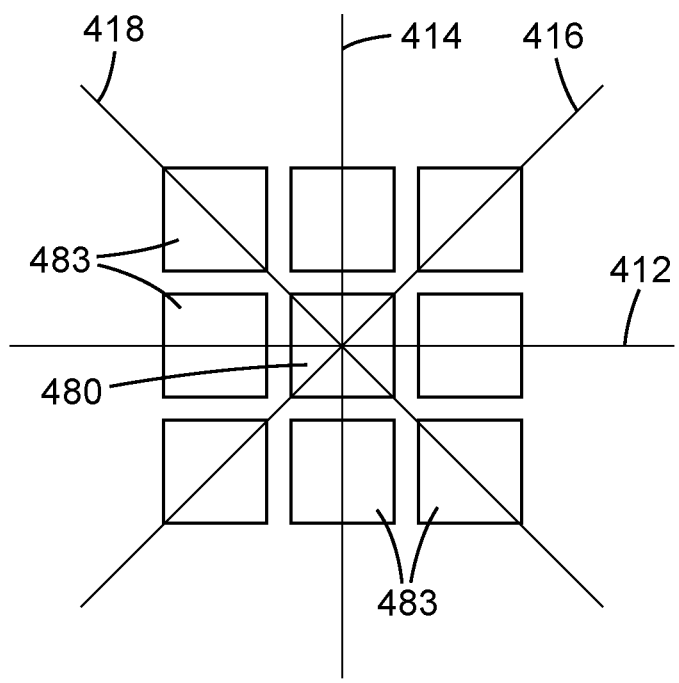
FIG. 5 is a schematic top view of a diffraction pattern produced by a grating diffracting a subpixel.

In some embodiments, a display including a light source, a two-dimensionally pixelated display surface (see, e.g., FIG. 2) for displaying an image, and a multilayer optical film of the present description disposed proximate the display surface (see, e.g., FIG. 4). The multilayer optical film includes a grating including first and second optical layers defining a two-dimensional grating interface therebetween extending along mutually orthogonal first and second directions as described further elsewhere herein (see, e.g., FIGS. 1A-1B). FIG. 5 is a schematic top view of a diffraction pattern produced by the grating diffracting a subpixel. Mutually orthogonal first and second axes or directions 412 and 414 are illustrated. The first and second axes or directions 412 and 414 define mutually orthogonal first and second diagonal axes or directions 416 and 418 therebetween. The first and second directions 412 and 414 may make oblique angles relative to major axes of a pixelated display in order to reduce moiré, for example. The grating diffracts at least one subpixel in each pixel into a zero diffraction order 480 and a plurality of first diffraction orders 483 along each of the first, second, first diagonal and second diagonal directions at a wavelength λ, such that intensities of the zero and first diffraction orders are within 10% of each other or such that intensities of the zero diffraction order and the average of all the first diffraction orders are within 10 percent of each other.

In some embodiments, the wavelength λ at which the zero and first diffraction orders, or the zero and the average of the first diffraction orders, are within 10% of each other in a range from about 550 nm, or about 580 nm, or about 590 nm, or about 595 nm, to about 650 nm, or about 620 nm, or about 610 nm, or about 605 nm. In some embodiments, λ is about 600 nm. In some embodiments, the wavelength λ at which the zero and first diffraction orders, or the zero and the average of the first diffraction orders, are within 10% of each other is specified relative to the peak wavelengths of an emission spectrum of a display surface (e.g., $\lambda=(1-\alpha)*\lambda b+\alpha*\lambda c$), as described further elsewhere herein.

There may be higher diffraction orders not illustrated in FIG. 5. The relative intensities of the zero and first diffraction orders vary with $|n1-n2|*H$ for a given wavelength. Typically, the intensity of the zero diffraction order decreases with increasing $|n1-n2|*H$ and the intensities of the first diffraction orders increase with increasing $|n1-n2|*H$ over some range of $|n1-n2|*H$ of interest, so that for a given wavelength λ, the grating can be selected to provide intensities of the zero and first diffraction orders, or intensities of the zero diffraction order and the average of all of the first diffraction orders, that are within 10% of each other by suitably selecting $|n1-n2|*H$. In some embodiments, when $|n1-n2|*H$ is selected such that the zero and first diffraction orders have equal intensities at one wavelength, the intensity will not be matched at a different wavelength.

There is a single zero diffraction order 480 and eight first diffraction orders 483 illustrated in FIG. 5. The diffraction peaks produced by a two-dimensional grating can be represented by a pair of integers (q1,q2) characterizing the diffraction in each of two orthogonal directions. In this representation, a zero diffraction order can be represented by (0,0) and a first diffraction order, as used herein, can be represented by (±1,0), (0,±1) or (±1,±1). The first diffraction orders (±1,0) are along the first direction 412, the first diffraction orders (0,±1) are along the second direction 414, the first diffraction orders (+1,+1) and (−1,−1) are along the first diagonal direction 416, and the first diffraction orders (+1,−1) and (−1,+1) are along the second diagonal direction 418.

Figure 6:
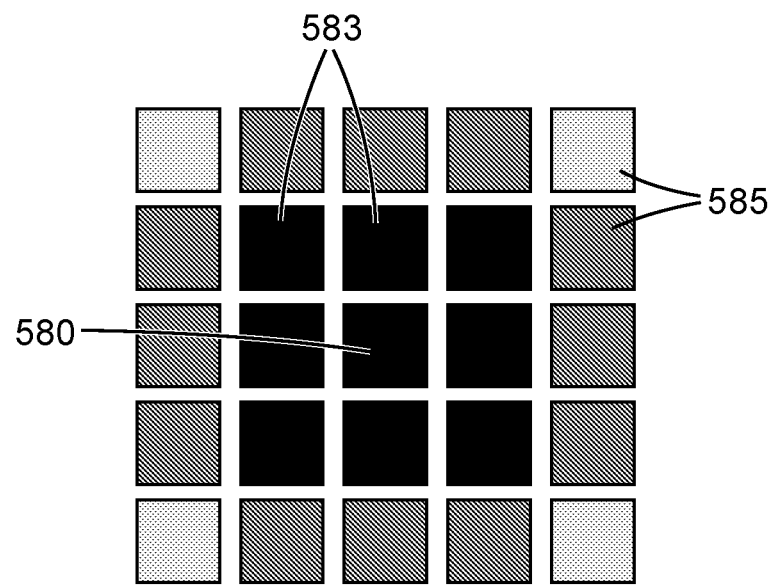
FIG. 6 is a schematic front view of an intensity distribution in a diffraction pattern.

FIG. 6 is a schematic front view of a diffraction pattern illustrating intensities of a zero diffraction order 580, first diffraction orders 583, and higher diffraction orders 585 of a diffraction pattern of a subpixel generated by a grating of a multilayer optical film of the present description. There are eight first diffraction orders 583, two along each of orthogonal first and second directions and two along each of first and second diagonal directions. Sixteen higher diffraction orders 585 are shown. The intensities of the higher diffraction orders are typically substantially less than the intensities of the zero and first diffraction orders. The intensities of the zero diffraction order 580 and the first diffraction orders 583 are within 10% or within 5% of each other.

The screen-door effect can be characterized by a screen-door effect index (SDEI), which can be determined by calculating the Fourier transform of the light output from a pixelated display surface when each of the subpixels of each primary color are illuminated. For each illuminated color, the ratio of the maximum higher order spatial frequency power of the Fourier transform to the zeroth order spatial frequency power is determined with any component having less than 0.5% of the total power considered to be noise and discarded. The SDEI is calculated as 100 times the weighted average of the ratios determined for each color where the weighting is determined by the fractional power output for the color. It is typically desired for the SDEI to be low (e.g., less than about 0.3, or less than about 0.25, or less than about 0.2, or less than about 0.15, or less than about 0.1, or less than about 0.05) and for the MTF at 10 line pairs per millimeter to be high (e.g., greater than about 0.4, or greater than about 0.45, or greater than about 0.5). In some embodiments, the screen-door effect is substantially eliminated so that any higher order spatial frequency is below the noise threshold. In this case the SDEI may be zero.

It has been found that the MTF and the SDEI typically decrease as $|n1-n2|*H$ increases. Thus it may be desired to have a relatively high $|n1-n2|*H$ from the standpoint of minimizing the SDEI, but to have a relatively low $|n1-n2|*H$ from the standpoint of maximizing the MTF. It has been found that desirable values for both MTF and SDEI can be achieved using a grating having $|n1-n2|*H$ in a range from about 0.24 micrometers to about 0.3 micrometers, or in a range from about 0.24 micrometers to about 0.29 micrometers, or in a range from about 0.25 micrometers to about 0.28 micrometers, or in a range from about 0.255 micrometers to about 0.275 micrometers with the refractive indices determined at a wavelength λ in a range from about 580 nm to about 650 nm or in any of the other ranges described elsewhere herein. In some embodiments, the optimal geometry of the grating depends on the emission spectrum of the display surface. In some embodiments, the wavelength λ used in determining the appropriate value of $|n1-n2|*H$, which may be a wavelength at which zero diffraction order and first diffraction orders are within 10% of each other, is equal to $(1-\alpha)*\lambda b+\alpha*\lambda c$ where α is in a range of 0.5 to 0.95, or in a range of 0.7 to 0.9, or in any of the ranges described further elsewhere herein. It has been found that an α of at least 0.5, or preferably at least 0.6, or more preferably at least 0.7 is sufficient to provide a desirable reduction in the screen-door effect according to some embodiments. It has been found that an α of no more than 0.95, or preferably no more than 0.92, or more preferably no more than 0.9, or even more preferably no more than 0.88, is sufficiently small to provide a desirable MTF according to some embodiments.

The desired period of the grating may depend on the pixel density of the display and/or on the distance between a pixelated display surface of the display and the grating. Increasing the period of the grating has been found to typically increase the MTF, but also typically increase the SDEI. In some embodiments, the preferred balance of MTF and SEDI can be achieved using a period in a range of about 1 micrometer to about 30 micrometers depending on the design of the display. It has been found that desirable values for both MTF and SDEI in some display configurations can be achieved using a grating having a period T in a range from about 7.5 micrometers to about 10 micrometers along first and second orthogonal directions.

Figure 7:
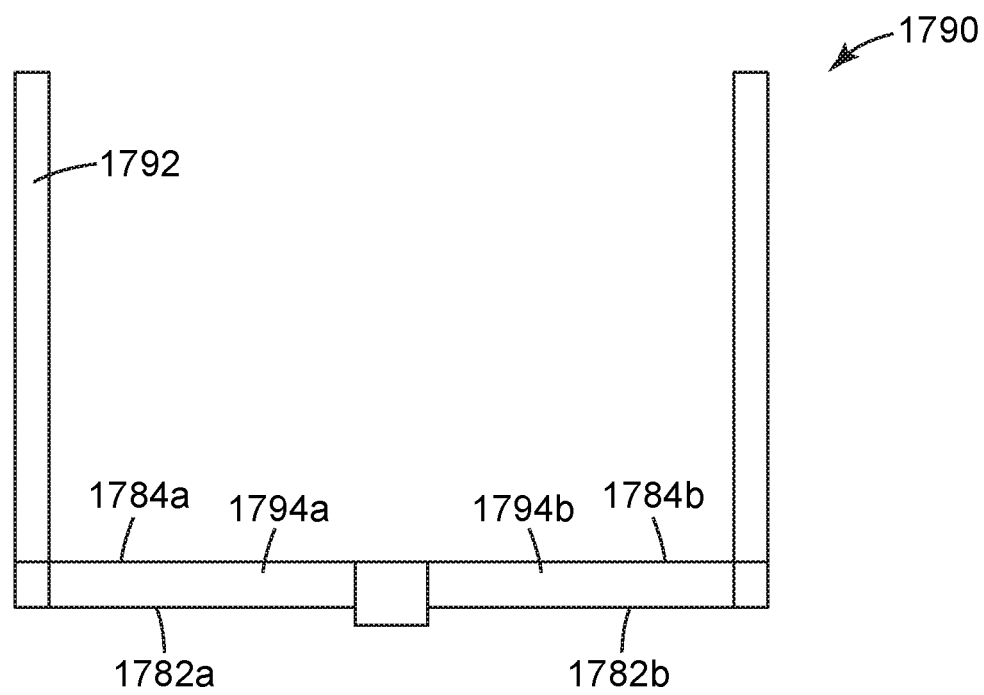
FIG. 7 is a schematic top view of a head-mounted display.
Figure 8A:
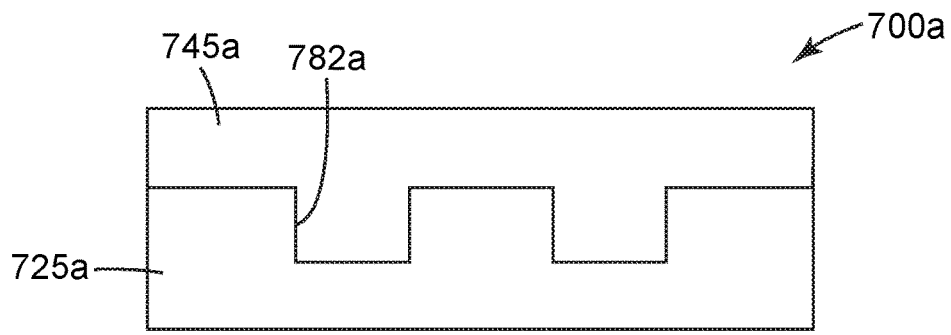
FIGS. 8A-8D are schematic cross-sectional views of multilayer optical films.
Figure 8B:
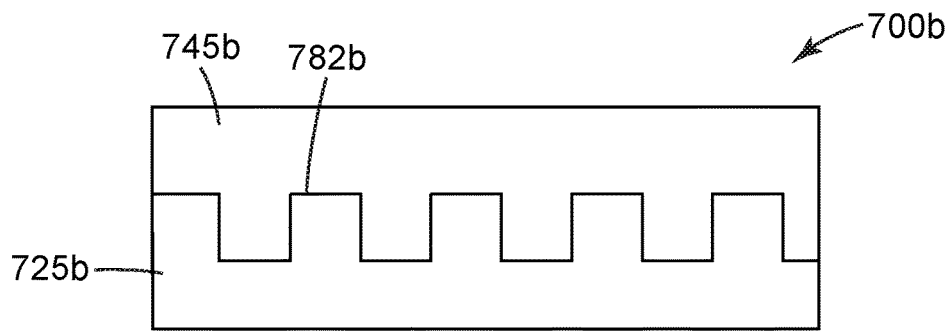
Figure 8C:
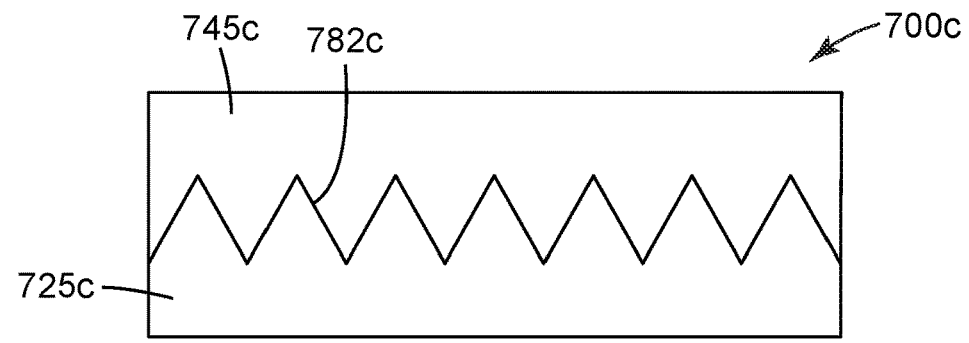
Figure 8D:
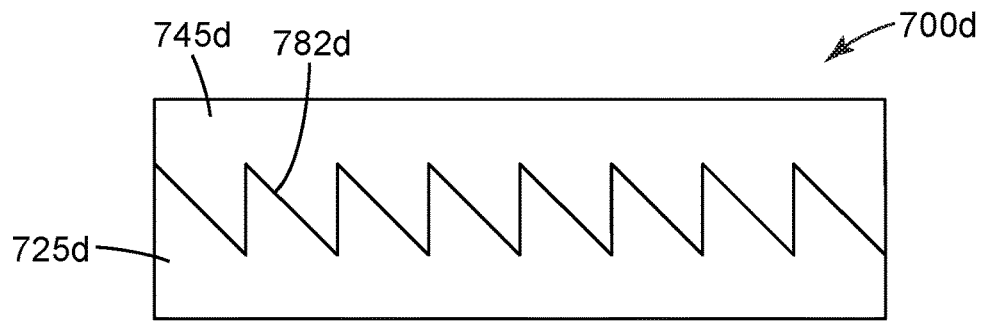

Any of the multilayer optical films, the optical systems, or the displays of the present description may be used in a device such as a virtual reality display or a head-mounted display (e.g., a virtual reality headset or an augmented reality headset). FIG. 7 is a schematic top view of head-mounted display 1790 including a frame 1792, and first and second display portions 1794a and 1794b. First and second display portions 1794a and 1794b include outer surfaces 1782a and 1782b, respectively, and inner surfaces 1784a and 1784b, respectively. Each of the first and second display portions 1794a and 1794b may include an optical system including a multilayer optical film of the present description. For example, first display portion 1794a (and similarly for second display portion 1794b) may include the optical system 450 with the display component 350 adjacent the outer surface 1782a and the multilayer optical film 300 disposed between the display component 350 and the inner surface 1784a. In some embodiments, a single display panel spanning portions 1794a and 1794b may be used instead of separate display panels. Head-mounted display 1790 may further include a camera and/or an eye tracking system as described further in U.S. Pat. No. 9,557,568 (Ouderkirk et al.), previously incorporated herein by reference. In some embodiments, the head-mounted display 1790 is a virtual reality display.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 5 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.95 and 1.05, and that the value could be 1.

The following is a list of exemplary embodiments of the present description.

Embodiment 1 is a multilayer optical film comprising:
a first optical layer having an index of refraction n1 at a wavelength $\lambda$ in a range from about 580 nm to about 650 nm; and
a second optical layer disposed on the first optical layer and having an index of refraction n2 at $\lambda$, the first and second optical layers defining a structured interface therebetween comprising a two-dimensional substantially sinusoidal grating extending along mutually orthogonal first and second directions, the grating having a period T in a range from about 7.5 micrometers to about 10 micrometers along each of the first and second directions and an average height H, such that |n1−n2|*H is in a range from about 0.24 micrometers to about 0.3 micrometers.

Embodiment 2 is the multilayer optical film of Embodiment 1, wherein |n1−n2|*H is in a range from about 0.24 micrometers to about 0.29 micrometers.

Embodiment 3 is the multilayer optical film of Embodiment 1, wherein |n1−n2|*H is in a range from about 0.25 micrometers to about 0.28 micrometers.

Embodiment 4 is the multilayer optical film of Embodiment 1, wherein |n1−n2|*H is in a range from about 0.255 micrometers to about 0.275 micrometers.

Embodiment 5 is the multilayer optical film of any one of Embodiments 1 to 4, wherein $\lambda$ is in a range from about 590 nm to about 620 nm.

Embodiment 6 is the multilayer optical film of any one of Embodiments 1 to 4, wherein $\lambda$ is in a range from about 590 nm to about 610 nm.

Embodiment 7 is the multilayer optical film of any one of Embodiments 1 to 4, wherein $\lambda$ is in a range from about 595 nm to about 605 nm.

Embodiment 8 is the multilayer optical film of any one of Embodiments 1 to 4, wherein $\lambda$ is about 600 nm.

Embodiment 9 is the multilayer optical film of any one of Embodiments 1 to 8, wherein H is in a range from about 1.1 micrometers to about 2.4 micrometers.

Embodiment 10 is the multilayer optical film of any one of Embodiments 1 to 9, wherein |n1−n2| is in a range from about 0.08 to about 0.25.

Embodiment 11 is the multilayer optical film of any one of Embodiments 1 to 10, wherein at least one of the first and second optical layers comprises a crosslinked resin.

Embodiment 12 is the multilayer optical film of any one of Embodiments 1 to 10, wherein at least one of the first and second optical layers comprises an optically clear adhesive.

Embodiment 13 is the multilayer optical film of any one of Embodiments 1 to 10, wherein the first optical layer comprises a crosslinked resin and the second optical layer comprises an optically clear adhesive.

The multilayer optical film of any one of Embodiments 1 to 13 may be a screen-door effect mitigation film for reducing the screen-door effect of a display.

Embodiment 14 is an optical system comprising:
a light source;
a two-dimensionally pixelated display surface for displaying an image; and
the multilayer optical film of any one of Embodiments 1 to 13 disposed on the display surface, such that when the display surface displays an image having a spatial frequency of about 10 line pairs per mm, the optical system magnifies the displayed image through the grating interface as a virtual image for viewing by a viewer, a modulation transfer function (MTF) of the virtual image being greater than about 0.4.

Embodiment 15 is a display comprising the optical system of Embodiment 14.

Embodiment 16 is a display comprising a two-dimensionally pixelated display surface and the multilayer optical film of any one of Embodiments 1 to 13 disposed proximate the display surface.

Embodiment 17 is the display of Embodiment 15 or 16 being a head-mounted display.

Embodiment 18 is the display of any one of Embodiments 15 to 17 being a virtual reality display.

Embodiment 19 is a display comprising:
a light source;
a two-dimensionally pixelated display surface for displaying an image, each pixel comprising at least three spaced apart subpixels; and
a multilayer optical film disposed on the display surface and comprising first and second optical layers defining a two-dimensional grating interface therebetween extending along mutually orthogonal first and second directions, the first and second directions defining mutually orthogonal first and second diagonal directions therebetween, the grating diffracting at least one subpixel in each pixel into a zero diffraction order and a plurality of first diffraction orders along each of the first, second, first diagonal and second diagonal directions at a wavelength $\lambda$ in a range from about 580 nm to about 650 nm, such that intensities of the zero and first diffraction orders are within 10% of each other.

Embodiment 20 is the display of Embodiment 19, wherein an emission spectrum of the display surface comprises a first peak wavelength $\lambda a$, a second peak wavelength $\lambda b$, and a third peak wavelength $\lambda c$, wherein $\lambda c > \lambda > \lambda b > \lambda a$.

Embodiment 21 is the display of Embodiment 20, wherein $\lambda = (1-\alpha)*\lambda b + \alpha*\lambda c$, $\alpha$ being in a range of 0.5 to 0.95.

Embodiment 22 is the display of Embodiment 21, wherein $\alpha$ is in a range of 0.6 to 0.92.

Embodiment 23 is the display of Embodiment 21, wherein $\alpha$ is in a range of 0.7 to 0.9.

Embodiment 24 is the display of Embodiment 21, wherein $\alpha$ is in a range of 0.7 to 0.88.

Embodiment 25 is the display of any one of Embodiments 19 to 24, wherein $\lambda$ is in a range from about 590 nm to about 620 nm.

Embodiment 26 is the display of any one of Embodiments 19 to 24, wherein $\lambda$ is in a range from about 590 nm to about 610 nm.

Embodiment 27 is the display of any one of Embodiments 19 to 24, wherein $\lambda$ is in a range from about 595 nm to about 605 nm.

Embodiment 28 is the display of any one of Embodiments 19 to 24, wherein $\lambda$ is about 600 nm.

Embodiment 29 is the display of any one of Embodiments 19 to 28, wherein the multilayer optical film is disposed directly on the display surface.

Embodiment 30 is the display of any one of Embodiments 19 to 28, wherein at least one additional layer is disposed between the multilayer optical film and the display surface.

Embodiment 31 is the display of any one of Embodiments 19 to 30, wherein the two-dimensional grating interface is substantially sinusoidal.

Embodiment 32 is the display of any one of Embodiments 19 to 30, wherein the two-dimensional grating interface comprises at least one of a square grating, a rectangular grating, a triangular grating, a sawtooth grating, and a post pattern.

Embodiment 33 is the display of any one of Embodiments 19 to 32, wherein an absolute value of a difference between indices of refraction of the first and second optical layers at the wavelength $\lambda$ is in a range from about 0.08 to about 0.25.

Embodiment 34 is the display of any one of Embodiments 19 to 33, wherein the grating interface has a period T in a range from about 7.5 micrometers to about 10 micrometers.

Embodiment 35 is the display of any one of Embodiments 19 to 33, wherein the grating interface has an average height H in a range from about 1.1 micrometers to about 2.4 micrometers.

Embodiment 36 is the display of any one of Embodiments 19 to 35, wherein an average height H of the grating interface multiplied by an absolute value of a difference between indices of refraction of the first and second optical layers at the wavelength $\lambda$ is in a range from about 0.24 micrometers to about 0.3 micrometers.

Embodiment 37 is the display of any one of Embodiments 19 to 35, wherein an average height H of the grating interface multiplied by an absolute value of a difference between indices of refraction of the first and second optical layers at the wavelength $\lambda$ is in a range from about 0.24 micrometers to about 0.29 micrometers.

Embodiment 38 is the display of any one of Embodiments 19 to 35, wherein an average height H of the grating interface multiplied by an absolute value of a difference between indices of refraction of the first and second optical layers at the wavelength $\lambda$ is in a range from about 0.25 micrometers to about 0.28 micrometers.

Embodiment 39 is the display of any one of Embodiments 19 to 35 wherein an average height H of the grating interface multiplied by an absolute value of a difference between indices of refraction of the first and second optical layers at the wavelength $\lambda$ is in a range from about 0.255 micrometers to about 0.275 micrometers.

Embodiment 40 is the display of any one of Embodiment 19 to 39 being a head-mounted display.

Embodiment 41 is the display of any one of Embodiments 19 to 40 being a virtual reality display.

Embodiment 42 is an optical system comprising:
a light source;
a two-dimensionally pixelated display surface for displaying an image; and
first and second optical layers disposed on the display surface and defining a two-dimensional grating interface therebetween, an absolute value of a difference between indices of refraction of the first and second optical layers at a wavelength $\lambda$ in a range from about 580 nm to about 650 nm being in a range from about 0.10 to about 0.25, the grating interface having a period T in a range from about 7.5 micrometers to about 10 micrometers and an average height H in a range from about 1.1 micrometers to about 2.4 micrometers, such that when the display surface displays an image having a spatial frequency of about 10 line pairs per mm, the optical system magnifies the displayed image through the grating interface as a virtual image for viewing by a viewer, a modulation transfer function (MTF) of the virtual image greater than about 0.4.

Embodiment 43 is the optical system of Embodiment 42, wherein H times the absolute value of the difference between the indices of refraction of the first and second optical layers at the wavelength $\lambda$ is in a range from about 0.24 micrometers to about 0.3 micrometers.

Embodiment 44 is the optical system of Embodiment 42, wherein H times the absolute value of the difference between the indices of refraction of the first and second optical layers at the wavelength $\lambda$ is in a range from about 0.24 micrometers to about 0.29 micrometers.

Embodiment 45 is the optical system of Embodiment 42, wherein H times the absolute value of the difference between the indices of refraction of the first and second optical layers at the wavelength $\lambda$ is in a range from about 0.25 micrometers to about 0.28 micrometers.

Embodiment 46 is the optical system of Embodiment 42, wherein H times the absolute value of the difference between the indices of refraction of the first and second optical layers at the wavelength $\lambda$ is in a range from about 0.255 micrometers to about 0.275 micrometers.

Embodiment 47 is the optical system of any one of Embodiments 42 to 46, wherein an emission spectrum of the display surface comprises a first peak wavelength $\lambda a$, a second peak wavelength $\lambda b$, and a third peak wavelength $\lambda c$, wherein $\lambda c > \lambda > \lambda b > \lambda a$.

Embodiment 48 is the optical system of any one of Embodiments 42 to 47, wherein $\lambda = (1-\alpha)*\lambda b + \alpha*\lambda c$, $\alpha$ being in a range of 0.5 to 0.95.

Embodiment 49 is the optical system of Embodiment 48, wherein $\alpha$ is in a range of 0.6 to 0.92.

Embodiment 50 is the optical system of Embodiment 48, wherein $\alpha$ is in a range of 0.7 to 0.9.

Embodiment 51 is the optical system of Embodiment 48, wherein $\alpha$ is in a range of 0.7 to 0.88.

Embodiment 52 is the optical system of any one of Embodiments 42 to 51, wherein $\lambda$ is in a range from about 590 nm to about 620 nm.

Embodiment 53 is the optical system of any one of Embodiments 42 to 51, wherein λ is in a range from about 590 nm to about 610 nm.

Embodiment 54 is the optical system of any one of Embodiments 42 to 51, wherein λ is in a range from about 595 nm to about 605 nm.

Embodiment 55 is the optical system of any one of Embodiments 42 to 51, wherein λ is about 600 nm.

Embodiment 56 is the optical system of any one of Embodiments 42 to 55, wherein a multilayer optical film comprises the first and second optical layers, the multilayer optical film being disposed directly on the display surface.

Embodiment 57 is the optical system any one of Embodiments 42 to 55, wherein a multilayer optical film comprises the first and second optical layers, at least one additional layer being disposed between the multilayer optical film and the display surface.

Embodiment 58 is the optical system any one of Embodiments 42 to 57, wherein the two-dimensional grating interface is substantially sinusoidal.

Embodiment 59 is the optical system any one of Embodiments 42 to 57, wherein the two-dimensional grating interface comprises at least one of a square grating, a rectangular grating, a triangular grating, a sawtooth grating, and a post pattern.

Embodiment 60 is the optical system of any one of Embodiments 42 to 59, wherein the MTF is greater than about 0.45.

Embodiment 61 is the optical system of any one of Embodiments 42 to 59, wherein the MTF is greater than about 0.5.

Embodiment 62 is a display comprising the optical system of any one of Embodiments 42 to 61.

Embodiment 63 is the display of Embodiment 62 being a head-mounted display.

Embodiment 64 is the display of Embodiment 62 or 63 being a virtual reality display.

EXAMPLES

Materials

| Abbreviation | Description |
| --- | --- |
| PET Film | 3 mil (75 micron), 1 side primed PET film, commercially available from 3M Company, St. Paul, MN |
| ADH1 | Acrylic based optically clear adhesive having a refractive index of 1.4823 at 633 nm and 1.487 at 532 nm. |
| TPO | 2,4,6-trimethylbenzoyl-diphenyl-phosphineoxide available from Sigma-Aldrich Chemical Company, Milwaukee, WI |
| CN-120 | Epoxy acrylate available from Sartomer Americas, Exton, PA |
| PEA | Phenoxyethyl acrylate available from Sigma-Aldrich Chemical Company, Milwaukee, WI |
| DAROCUR 1173 | Photoinitiator available from BASF, Ludwigshafen, Germany |
| ADH2 | Acrylic based optically clear adhesive having a refractive index of 1.4722 at 633 nm. |
| ADH3 | Acrylic based optically clear adhesive having a refractive index of 1.458 at 633 nm and 1.46 at 532 nm. |
| ADH4 | Silicone based optically clear adhesive having a refractive index of 1.406 at 633 nm and 1.409 at 532 nm. |
| R1 | Polymerizable resin composition having a refractive index when cured of 1.565 at 633 nm and 1.574 at 532 nm prepared by mixing CN-120, PEA, DAROCUR 1173, TPO at a weight ratio of 75/25/0.25/0.1. |
| R2 | Acrylic resin composition prepared as generally described in U.S. Pat. No. 9,360,591 (Hunt et al.) and having a refractive index when cured of 1.6424 at 633 nm and 1.6522 at 532 nm. |

Examples 1-5 and Comparative Examples A and B

A film sample utilizing a grating was prepared according to the following procedure. A tool was fabricated using a diamond turning method that utilized a fast tool servo (FTS) as described, for example, in PCT Published Application No. WO 00/48037 (Campbell et al.), and U.S. Pat. No. 7,350,442 (Ehnes et al.) and U.S. Pat. No. 7,328,638 (Gardiner et al.). The tool was used in a cast-and-cure process as described, for example, in U.S. Pat. No. 5,175,030 (Lu et al.) and U.S. Pat. No. 5,183,597 (Lu), to produce two-directional sinusoidal structures on the primed side of a 3 mil (0.075 mm) thick PET film. An acrylate resin (R1 or R2) having a refractive index at 633 nm as indicated in Table 1 was used to form the sinusoidal structures. Samples were made having a peak-to-valley height H and a same period T in each of two orthogonal directions as indicated in Table 1. The grating structure was then overcoated with an adhesive (ADH1, ADH2, ADH3, or ADH4) having a refractive index at 633 nm as indicated in Table 1. Samples using ADH1 or ADH2 were then UV cured. Samples using ADH3 and ADH4 were then dried in an oven at 100° C. for 5 min.

Examples 1, 2 and 5 utilized R2 resin, and Comparative Examples A and B and Examples 3 and 4 utilized R1 resin. Example 1 utilized ADH2 adhesive, Comparative Examples A and B utilized ADH1 adhesive, Examples 2 and 3 utilized ADH3 adhesive, and Examples 3 and 5 utilized ADH4 adhesive.

The parameter |n1−n2|*H at various wavelengths for some of the films are reported in Table 2. The value at 600 nm was determined by interpolation from the values at 532 nm and 633 nm.

Each of the multilayer optical films was laminated to a panel of a Sony Playstation VR headset having about 450 pixels per inch (PPI) using the adhesive layer of the film to attach the film to the panel. The films were laminated at a 15 degree bias to the panel. Pictures were taken of the panel using a ProMetric® I camera (available from Radiant Vision Systems, LLC, Redmond, Wash.) through a 2.5× microscope objective. The Fourier transformation of the display image in 3 different color planes were analyzed, and the computed screen-door effect index (SDEI) for the samples are reported in Table 1. Similarly, the resolution line-chart images were taken with the same measurement system, and the modulated transfer function (MTF) at 10 line pairs per mm were computed and are reported in Table 1. Each of Examples 1-5 gave a reduced SDEI compared to Comparative Examples A-B while providing an acceptable MTF which, in some cases, is improved compared to Comparative Examples A-B.

TABLE 1

| Example | H (μm) | n1 | n2 | \|n1−n2\|*H (μm) | T (μm) | SDEI | MTF |
| --- | --- | --- | --- | --- | --- | --- | --- |
| A | 2.4 | 1.565 | 1.4823 | 0.1985 | 8 | 0.34 | 0.48 |
| B | 2.4 | 1.565 | 1.4823 | 0.1985 | 10 | 0.55 | 0.53 |
| 1 | 1.4 | 1.6424 | 1.4722 | 0.2383 | 7.5 | 0.31 | 0.43 |
| 2 | 1.4 | 1.6424 | 1.458 | 0.2582 | 7.5 | 0.01 | 0.42 |
| 3 | 1.675 | 1.565 | 1.406 | 0.2669 | 9 | 0.00 | 0.63 |
| 4 | 2.4 | 1.565 | 1.458 | 0.2568 | 10 | 0.21 | 0.54 |
| 5 | 1.14 | 1.6424 | 1.406 | 0.2699 | 8 | 0.00 | 0.51 |

TABLE 2

| Example | $\|n1-n2\|*H$ at 532 nm (µm) | $\|n1-n2\|*H$ at 600 nm (µm) | $\|n1-n2\|*H$ at 633 nm (µm) |
| --- | --- | --- | --- |
| A | 0.2088 | 0.2019 | 0.1985 |
| B | 0.2088 | 0.2019 | 0.1985 |
| 2 | 0.2691 | 0.2617 | 0.2582 |
| 3 | 0.2764 | 0.2700 | 0.2669 |
| 4 | 0.2736 | 0.2623 | 0.2568 |
| 5 | 0.2750 | 0.2716 | 0.2699 |

The diffraction power distribution at λ=600 nm for Example 2 is shown in Table 3. The number in the center of the table, 8.5760%, corresponds to the zero diffraction order and the remaining numbers are first diffraction orders. The arrangement of the numbers in the table corresponds to the diffraction pattern shown in FIG. 5.

TABLE 3

| | | |
| --- | --- | --- |
| 9.1489% | 8.8573% | 9.1489% |
| 8.8573% | 8.5750% | 8.8573% |
| 9.1489% | 8.8573% | 9.1489% |

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system comprising:
   a two-dimensionally pixelated display surface for displaying an image; and
   a multilayer optical film disposed on the display surface, the multilayer optical film comprising:
      a first optical layer having an index of refraction n1 at a wavelength λ in a range from about 580 nm to about 650 nm; and
      a second optical layer disposed on the first optical layer and having an index of refraction n2 at λ, the first and second optical layers defining a structured interface therebetween comprising a two-dimensional substantially sinusoidal grating extending along mutually orthogonal first and second directions, the grating having a period T in a range from about 7.5 micrometers to about 10 micrometers along each of the first and second directions and an average height H, such that $|n1-n2|*H$ is in a range from about 0.24 micrometers to about 0.3 micrometers,
   wherein an emission spectrum of the display surface comprises a first peak wavelength λa, a second peak wavelength λb, and a third peak wavelength λc, wherein λc>λ>λb>λa, and wherein λ=(1−α)*λb+α*λc, α being in a range of 0.5 to 0.95.

2. The optical system of claim 1, wherein λ is in a range from about 590 nm to about 620 nm.

3. The optical system of claim 1, wherein H is in a range from about 1.1 micrometers to about 2.4 micrometers.

4. The optical system of claim 1, wherein $|n1-n2|$ is in a range from about 0.08 to about 0.25.

5. The optical system of claim 1, wherein the first optical layer comprises a crosslinked resin and the second optical layer comprises an optically clear adhesive.

6. The optical system of claim 1,
   wherein when the display surface displays an image having a spatial frequency of about 10 line pairs per mm, the optical system magnifies the displayed image through the structured interface as a virtual image for viewing by a viewer, a modulation transfer function (MTF) of the virtual image being greater than about 0.4.

7. A display comprising:
   a light source;
   a two-dimensionally pixelated display surface for displaying an image, each pixel comprising at least three spaced apart subpixels; and
   a multilayer optical film disposed on the display surface and comprising first and second optical layers defining a two-dimensional grating interface therebetween extending along mutually orthogonal first and second directions, the first and second directions defining mutually orthogonal first and second diagonal directions therebetween, the grating diffracting at least one subpixel in each pixel into a zero diffraction order and a plurality of first diffraction orders along each of the first, second, first diagonal and second diagonal directions at a wavelength λ in a range from about 580 nm to about 650 nm, such that intensities of the zero and first diffraction orders are within 10% of each other,
   wherein an emission spectrum of the display surface comprises a first peak wavelength λa, a second peak wavelength λb, and a third peak wavelength λc, wherein λc>λ>λb>λa, and wherein λ=(1−α)*λb+α*λc, α being in a range of 0.5 to 0.95.

8. The display of claim 7, wherein α is in a range of 0.6 to 0.92.

9. The display of claim 7, wherein λ is in a range from about 595 nm to about 605 nm.

10. An optical system comprising:
    a light source;
    a two-dimensionally pixelated display surface for displaying an image; and
    first and second optical layers disposed on the display surface and defining a two-dimensional grating interface therebetween, an absolute value of a difference between indices of refraction of the first and second optical layers at a wavelength λ in a range from about 580 nm to about 650 nm being in a range from about 0.10 to about 0.25, the grating interface having a period T in a range from about 7.5 micrometers to about 10 micrometers and an average height H in a range from about 1.1 micrometers to about 2.4 micrometers, such that when the display surface displays an image having a spatial frequency of about 10 line pairs per mm, the optical system magnifies the displayed image through the grating interface as a virtual image for viewing by a viewer, a modulation transfer function (MTF) of the virtual image greater than about 0.4.

11. The optical system of claim 10, wherein H times the absolute value of the difference between the indices of refraction of the first and second optical layers at the wavelength λ is in a range from about 0.24 micrometers to about 0.3 micrometers.

12. The optical system of claim 10, wherein an emission spectrum of the display surface comprises a first peak wavelength λa, a second peak wavelength λb, and a third peak wavelength λc, wherein λc>λ>λb>λa.

13. The optical system of claim 12, wherein $\lambda=(1-\alpha)*\lambda b+\alpha*\lambda c$, $\alpha$ being in a range of 0.5 to 0.95.

14. A display comprising the optical system of claim 10, wherein the display is a head-mounted display.

* * * * *